(12) United States Patent
Finn et al.

(10) Patent No.: US 10,943,320 B2
(45) Date of Patent: Mar. 9, 2021

(54) SYSTEM AND METHOD FOR ROBOTIC INSPECTION

(71) Applicant: United Technologies Corporation, Farmington, CT (US)

(72) Inventors: Alan Matthew Finn, Hebron, CT (US); Jose Miguel Pasini, Avon, CT (US); Richard W. Osborne, III, Stafford Springs, CT (US); Edgar A. Bernal, Webster, NY (US); Ozgur Erdinc, Mansfield, CT (US); Olusegun Oshin, Manchester, CT (US); Ziyou Xiong, Wethersfield, CT (US); Catalin G. Fotache, West Hartford, CT (US); Gene B. Donskoy, Farmington, CT (US); Sergio S. Frutuoso, Avon, CT (US); Joseph A. Sylvestro, Avon, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 266 days.

(21) Appl. No.: 15/970,944

(22) Filed: May 4, 2018

(65) Prior Publication Data
US 2019/0340721 A1 Nov. 7, 2019

(51) Int. Cl.
*B25J 9/16* (2006.01)
*G06T 1/00* (2006.01)
(Continued)

(52) U.S. Cl.
CPC ........... *G06T 1/0014* (2013.01); *B25J 9/1664* (2013.01); *B25J 9/1679* (2013.01); *B25J 9/1694* (2013.01);
(Continued)

(58) Field of Classification Search
CPC combination set(s) only.
See application file for complete search history.

(56) References Cited

U.S. PATENT DOCUMENTS

| | | |
|---|---|---|
| 3,804,397 A | 4/1974 | Neumann |
| 4,402,053 A | 8/1983 | Kelley et al. |
| | (Continued) | |

FOREIGN PATENT DOCUMENTS

| | | |
|---|---|---|
| CA | 2820732 A1 | 12/2014 |
| DE | 19710743 A1 | 9/1998 |
| | (Continued) | |

OTHER PUBLICATIONS

U.S. Final Office Action dated Mar. 12, 2020 for corresponding U.S. Appl. No. 15/971,194.
(Continued)

*Primary Examiner* — Spencer D Patton
(74) *Attorney, Agent, or Firm* — Bachman & LaPointe, PC

(57) ABSTRACT

A method for robotic inspection of a part, includes the steps of: supporting the part with a robot mechanism; obtaining part-related sensor input with a sensor positioned to inspect the part supported by the robot mechanism; and controlling movement of the robot mechanism relative to the sensor, wherein the controlling is done by a feedback control unit which receives the sensor input, and the feedback control unit is configured to control the robot mechanism based upon the sensor input.

19 Claims, 2 Drawing Sheets

(51) Int. Cl.
*H04N 5/232* (2006.01)
*H04N 5/235* (2006.01)

(52) U.S. Cl.
CPC .......... *B25J 9/1697* (2013.01); *H04N 5/2354* (2013.01); *H04N 5/23212* (2013.01); *Y10S 901/44* (2013.01); *Y10S 901/46* (2013.01); *Y10S 901/47* (2013.01)

(56) References Cited

U.S. PATENT DOCUMENTS

| | | | |
|---|---|---|---|
| 4,403,294 A | 9/1983 | Hamada et al. | |
| 4,873,651 A | 10/1989 | Raviv | |
| 5,064,291 A | 11/1991 | Reiser | |
| 5,119,678 A | 6/1992 | Bashyam et al. | |
| 5,345,514 A | 9/1994 | Mandavieh et al. | |
| 5,345,515 A | 9/1994 | Nishi et al. | |
| 5,351,078 A | 9/1994 | Lemelson | |
| 5,963,328 A | 10/1999 | Yoshida et al. | |
| 6,023,637 A | 2/2000 | Liu et al. | |
| 6,153,889 A | 11/2000 | Jones | |
| 6,177,682 B1 | 1/2001 | Bartulovic et al. | |
| 6,271,520 B1 | 8/2001 | Tao et al. | |
| 6,399,948 B1 | 6/2002 | Thomas | |
| 6,434,267 B1 | 8/2002 | Smith | |
| 6,462,813 B1 | 10/2002 | Haven et al. | |
| 6,690,016 B1 | 2/2004 | Watkins et al. | |
| 6,737,648 B2 | 5/2004 | Fedder et al. | |
| 6,759,659 B2 | 7/2004 | Thomas et al. | |
| 6,804,622 B2 | 10/2004 | Bunker et al. | |
| 6,907,358 B2 | 6/2005 | Suh et al. | |
| 6,965,120 B1 | 10/2005 | Beyerer et al. | |
| 7,026,811 B2 | 4/2006 | Roney, Jr. et al. | |
| 7,064,330 B2 | 6/2006 | Raulerson et al. | |
| 7,119,338 B2 | 10/2006 | Thompson et al. | |
| 7,122,801 B2 | 10/2006 | Favro et al. | |
| 7,129,492 B2 | 10/2006 | Saito et al. | |
| 7,164,146 B2 | 1/2007 | Weir et al. | |
| 7,190,162 B2 | 3/2007 | Tenley et al. | |
| 7,220,966 B2 | 5/2007 | Saito et al. | |
| 7,233,867 B2 | 6/2007 | Pisupati et al. | |
| 7,240,556 B2 | 7/2007 | Georgeson et al. | |
| 7,272,529 B2 | 9/2007 | Hogan et al. | |
| 7,313,961 B2 | 1/2008 | Tenley et al. | |
| 7,415,882 B2 | 8/2008 | Fetzer et al. | |
| 7,446,886 B2 | 11/2008 | Aufmuth et al. | |
| 7,489,811 B2 | 2/2009 | Brummel et al. | |
| 7,602,963 B2 | 10/2009 | Nightingale et al. | |
| 7,689,030 B2 | 3/2010 | Suh et al. | |
| 7,724,925 B2 | 5/2010 | Shepard | |
| 7,738,725 B2 | 6/2010 | Raskar et al. | |
| 7,823,451 B2 | 11/2010 | Sarr | |
| 7,966,883 B2 | 6/2011 | Lorraine et al. | |
| 8,050,491 B2 | 11/2011 | Vaidyanathan | |
| 8,204,294 B2 | 6/2012 | Alloo et al. | |
| 8,208,711 B2 | 6/2012 | Venkatachalam et al. | |
| 8,221,825 B2 | 7/2012 | Reitz et al. | |
| 8,239,424 B2 | 8/2012 | Haigh et al. | |
| 8,431,917 B2 | 4/2013 | Wang et al. | |
| 8,449,176 B2 | 5/2013 | Shepard | |
| 8,520,931 B2 | 8/2013 | Tateno | |
| 8,528,317 B2 | 9/2013 | Gerez et al. | |
| 8,692,887 B2 | 4/2014 | Ringermacher et al. | |
| 8,744,166 B2 | 6/2014 | Scheid et al. | |
| 8,761,490 B2 | 6/2014 | Scheid et al. | |
| 8,781,209 B2 | 7/2014 | Scheid et al. | |
| 8,781,210 B2 | 7/2014 | Scheid et al. | |
| 8,792,705 B2 | 7/2014 | Scheid et al. | |
| 8,913,825 B2 | 12/2014 | Taguchi et al. | |
| 8,983,794 B1 | 3/2015 | Motzer et al. | |
| 9,037,381 B2 | 5/2015 | Care | |
| 9,046,497 B2 | 6/2015 | Kush | |
| 9,066,028 B1 | 6/2015 | Koshti | |
| 9,080,453 B2 | 7/2015 | Shepard et al. | |
| 9,116,071 B2 | 8/2015 | Hatcher, Jr. et al. | |
| 9,134,280 B2 | 9/2015 | Cataldo et al. | |
| 9,146,205 B2 | 9/2015 | Renshaw et al. | |
| 9,151,698 B2 | 10/2015 | Jahnke et al. | |
| 9,154,743 B2 | 10/2015 | Hatcher, Jr. et al. | |
| 9,240,049 B2 | 1/2016 | Ciurea et al. | |
| 9,251,582 B2 | 2/2016 | Lim et al. | |
| 9,300,865 B2 | 3/2016 | Wang et al. | |
| 9,305,345 B2 | 4/2016 | Lim | |
| 9,458,735 B1 | 10/2016 | Diwinsky et al. | |
| 9,465,385 B2 | 10/2016 | Kamioka et al. | |
| 9,467,628 B2 | 10/2016 | Geng et al. | |
| 9,471,057 B2 | 10/2016 | Scheid et al. | |
| 9,476,798 B2 | 10/2016 | Pandey et al. | |
| 9,476,842 B2 | 10/2016 | Drescher et al. | |
| 9,483,820 B2 | 11/2016 | Lim et al. | |
| 9,488,592 B1 | 11/2016 | Maresca et al. | |
| 9,519,844 B1 | 12/2016 | Thompson et al. | |
| 9,594,059 B1 | 3/2017 | Brady et al. | |
| 9,734,568 B2 | 5/2017 | Vajaria et al. | |
| 9,785,919 B2 | 10/2017 | Diwinsky et al. | |
| 9,804,997 B2 | 10/2017 | Sharp et al. | |
| 9,808,933 B2 | 11/2017 | Lin et al. | |
| 9,981,382 B1* | 5/2018 | Strauss | B25J 9/1666 |
| 10,438,036 B1 | 10/2019 | Reome et al. | |
| 2002/0121602 A1 | 9/2002 | Thomas et al. | |
| 2002/0167660 A1 | 11/2002 | Zaslavsky | |
| 2003/0117395 A1 | 6/2003 | Yoon | |
| 2003/0205671 A1 | 11/2003 | Thomas et al. | |
| 2004/0089811 A1 | 5/2004 | Lewis et al. | |
| 2004/0089812 A1 | 5/2004 | Favro et al. | |
| 2004/0139805 A1 | 7/2004 | Antonelli et al. | |
| 2004/0201672 A1 | 10/2004 | Varadarajan et al. | |
| 2004/0240600 A1 | 12/2004 | Freyer et al. | |
| 2004/0245469 A1 | 12/2004 | Favro et al. | |
| 2004/0247170 A1 | 12/2004 | Furze et al. | |
| 2005/0008215 A1 | 1/2005 | Shepard | |
| 2005/0113060 A1 | 5/2005 | Lowery | |
| 2005/0151083 A1 | 7/2005 | Favro et al. | |
| 2005/0167596 A1 | 8/2005 | Rothenfusser et al. | |
| 2005/0276907 A1 | 12/2005 | Harris et al. | |
| 2006/0012790 A1 | 1/2006 | Furze et al. | |
| 2006/0078193 A1* | 4/2006 | Brummel | G01N 21/8806 382/152 |
| 2006/0086912 A1 | 4/2006 | Weir et al. | |
| 2007/0007733 A1 | 1/2007 | Hogarth et al. | |
| 2007/0017297 A1 | 1/2007 | Georgeson et al. | |
| 2007/0045544 A1 | 3/2007 | Favro et al. | |
| 2008/0022775 A1 | 1/2008 | Sathish et al. | |
| 2008/0053234 A1 | 3/2008 | Staroselsky et al. | |
| 2008/0111074 A1 | 5/2008 | Weir et al. | |
| 2008/0183402 A1 | 7/2008 | Malkin et al. | |
| 2008/0229834 A1 | 9/2008 | Bossi et al. | |
| 2008/0247635 A1 | 10/2008 | Davis et al. | |
| 2008/0247636 A1 | 10/2008 | Davis et al. | |
| 2009/0000382 A1 | 1/2009 | Sathish et al. | |
| 2009/0010507 A1 | 1/2009 | Geng | |
| 2009/0066939 A1 | 3/2009 | Venkatachalam et al. | |
| 2009/0128643 A1 | 5/2009 | Kondo et al. | |
| 2009/0252987 A1 | 10/2009 | Greene, Jr. | |
| 2009/0279772 A1 | 11/2009 | Sun et al. | |
| 2009/0312956 A1 | 12/2009 | Zombo et al. | |
| 2010/0212430 A1 | 8/2010 | Murai et al. | |
| 2010/0220910 A1 | 9/2010 | Kaucic et al. | |
| 2011/0062339 A1 | 3/2011 | Ruhge et al. | |
| 2011/0083705 A1 | 4/2011 | Stone et al. | |
| 2011/0119020 A1 | 5/2011 | Key | |
| 2011/0123093 A1 | 5/2011 | Alloo et al. | |
| 2011/0299752 A1 | 12/2011 | Sun | |
| 2011/0302694 A1 | 12/2011 | Wang et al. | |
| 2012/0154599 A1 | 6/2012 | Huang | |
| 2012/0188380 A1 | 7/2012 | Drescher et al. | |
| 2012/0249959 A1 | 10/2012 | You et al. | |
| 2012/0275667 A1 | 11/2012 | Lu | |
| 2012/0293647 A1 | 11/2012 | Singh et al. | |
| 2013/0028478 A1 | 1/2013 | St-Pierre et al. | |
| 2013/0041614 A1 | 2/2013 | Shepard et al. | |
| 2013/0070897 A1* | 3/2013 | Jacotin | G01N 23/18 378/62 |
| 2013/0113914 A1 | 5/2013 | Scheid et al. | |

(56) References Cited

U.S. PATENT DOCUMENTS

| | | |
|---|---|---|
| 2013/0113916 A1 | 5/2013 | Scheid et al. |
| 2013/0163849 A1 | 6/2013 | Jahnke et al. |
| 2013/0235897 A1 | 9/2013 | Bouteyre et al. |
| 2013/0250067 A1* | 9/2013 | Laxhuber ............ H04N 13/239 348/47 |
| 2014/0022357 A1 | 1/2014 | Yu et al. |
| 2014/0056507 A1 | 2/2014 | Doyle et al. |
| 2014/0098836 A1 | 4/2014 | Bird |
| 2014/0184786 A1 | 7/2014 | Georgeson et al. |
| 2014/0185912 A1 | 7/2014 | Lim et al. |
| 2014/0198185 A1 | 7/2014 | Haugen et al. |
| 2014/0200832 A1 | 7/2014 | Troy et al. |
| 2014/0350338 A1 | 11/2014 | Tanaka et al. |
| 2015/0041654 A1 | 2/2015 | Barychev et al. |
| 2015/0046098 A1 | 2/2015 | Jack et al. |
| 2015/0086083 A1 | 3/2015 | Chaudhry et al. |
| 2015/0128709 A1 | 5/2015 | Stewart et al. |
| 2015/0138342 A1 | 5/2015 | Brdar et al. |
| 2015/0185128 A1 | 7/2015 | Chang et al. |
| 2015/0233714 A1 | 8/2015 | Kim |
| 2015/0253266 A1 | 9/2015 | Lucon et al. |
| 2015/0314901 A1 | 11/2015 | Murray et al. |
| 2016/0012588 A1 | 1/2016 | Taguchi et al. |
| 2016/0043008 A1 | 2/2016 | Murray et al. |
| 2016/0109283 A1 | 4/2016 | Broussais-Colella et al. |
| 2016/0178532 A1 | 6/2016 | Lim et al. |
| 2016/0241793 A1 | 8/2016 | Ravirala et al. |
| 2016/0284098 A1 | 9/2016 | Okumura et al. |
| 2016/0314571 A1 | 10/2016 | Finn et al. |
| 2016/0328835 A1 | 11/2016 | Maresca, Jr. et al. |
| 2016/0334284 A1 | 11/2016 | Kaplun Mucharrafille et al. |
| 2017/0011503 A1 | 1/2017 | Newman |
| 2017/0023505 A1 | 1/2017 | Maione et al. |
| 2017/0052152 A1 | 2/2017 | Tat et al. |
| 2017/0085760 A1 | 3/2017 | Ernst et al. |
| 2017/0090458 A1 | 3/2017 | Lim |
| 2017/0122123 A1 | 5/2017 | Kell et al. |
| 2017/0142302 A1 | 5/2017 | Shaw et al. |
| 2017/0184469 A1 | 6/2017 | Chang et al. |
| 2017/0184549 A1 | 6/2017 | Reed et al. |
| 2017/0184650 A1 | 6/2017 | Chang et al. |
| 2017/0211408 A1 | 7/2017 | Ahmadian et al. |
| 2017/0219815 A1 | 8/2017 | Letter et al. |
| 2017/0221274 A1 | 8/2017 | Chen et al. |
| 2017/0234837 A1 | 8/2017 | Hall et al. |
| 2017/0241286 A1 | 8/2017 | Roberts et al. |
| 2017/0258391 A1 | 9/2017 | Finn et al. |
| 2017/0262965 A1 | 9/2017 | Xiong et al. |
| 2017/0262977 A1 | 9/2017 | Finn et al. |
| 2017/0262979 A1 | 9/2017 | Xiong et al. |
| 2017/0262985 A1 | 9/2017 | Finn et al. |
| 2017/0262986 A1 | 9/2017 | Xiong et al. |
| 2017/0270651 A1 | 9/2017 | Bailey et al. |
| 2017/0297095 A1 | 10/2017 | Zalameda et al. |
| 2017/0284971 A1 | 11/2017 | Hall |
| 2018/0002039 A1 | 1/2018 | Finn et al. |
| 2018/0005362 A1 | 1/2018 | Wang et al. |
| 2018/0013959 A1 | 1/2018 | Slavens et al. |
| 2018/0019097 A1 | 1/2018 | Harada et al. |
| 2018/0098000 A1 | 4/2018 | Park et al. |
| 2018/0111239 A1 | 4/2018 | Zak et al. |
| 2019/0299542 A1 | 10/2019 | Webb |
| 2019/0338666 A1 | 11/2019 | Finn et al. |
| 2019/0339131 A1 | 11/2019 | Finn et al. |
| 2019/0339165 A1 | 11/2019 | Finn et al. |
| 2019/0339206 A1 | 11/2019 | Xiong et al. |
| 2019/0339207 A1 | 11/2019 | Finn et al. |
| 2019/0339234 A1 | 11/2019 | Finn et al. |
| 2019/0339235 A1 | 11/2019 | Finn et al. |
| 2019/0340742 A1 | 11/2019 | Finn et al. |
| 2019/0340805 A1 | 11/2019 | Xiong et al. |
| 2019/0342499 A1 | 11/2019 | Xiong et al. |

FOREIGN PATENT DOCUMENTS

| | | | |
|---|---|---|---|
| EP | 1961919 A2 | | 8/2008 |
| GB | 2545271 A | | 6/2017 |
| JP | 06235700 A | * | 8/1994 |
| JP | 06235700 A | | 8/1994 |
| JP | 2015161247 A | | 9/2015 |
| SG | 191452 A1 | | 7/2013 |
| WO | 2013088709 A1 | | 6/2013 |
| WO | 2016112018 A1 | | 7/2016 |
| WO | 2016123508 A1 | | 8/2016 |
| WO | 2016176524 A1 | | 11/2016 |

OTHER PUBLICATIONS

E. J. Candes, X. Li, Y. Ma, and J. Wright, "Robust Principal Component Analysis", submitted. http://www-stat.stanford.edu/~candes/papers/RobustPCA.pdf.

M. Sznaier, O. Camps, N. Ozay, T. Ding, G. Tadmor and D. Brooks, "The Role of Dynamics in Extracting Information Sparsely Encoded in High Dimensional Data Streams", in Dynamics of Information Systems, Hirsch, M.J.; Pardalos, P.M.; Murphey, R. (Eds.), pp. 1-28, Springer Verlag, 2010.

M. Fazel, H. Hindi, and S. Boyd, "A Rank Minimization Heuristic with Application to Minimum Order System Approximation", American Control Conference, Arlington, Virginia, pp. 4734-4739, Jun. 2001.

Meola et al., 'An Excursus on Infrared Thermography Imaging', J. Imaging 2016, 2, 36 http://www.mdpi.com/2313-433X/2/4/36/pdf.

Yu et al., 'ASIFT: An Algorithm for Fully Affine Invariant Comparison', Image Processing on Line on Feb. 24, 2011. http://www.ipol.im/pub/art/2011/my-asift/article.pdf.

Schemmel et al., 'Measurement of Direct Strain Optic Coefficient of YSZ Thermal Barrier Coatings at Ghz Frequencies', Optics Express, v.25, n. 17, Aug. 21, 2017, https://doi.org/10.1364/OE.25.019968.

Jean-Yves Bouguet, "Camera Calibration Toolbox for Matlab", http://www.vision.caltech.edu/bouguetj/calib_doc/, accessed on Nov. 10, 2017.

https://www.qualitymag.com/articles/91976-from-human-to-machine-how-to-be-prepared-for-integration-of-automated-visual-inspection.

http://www.yxlon.com/products/x-ray-and-ct-inspection-systems/yxlon-mu56-tb.

Yu et al. 'Shadow Graphs and 3D Texture Reconstruction', IJCV, vol. 62, No. 1-2, 2005, pp. 35-60.

U.S. Non-Final Office Action dated Nov. 26, 2019 for corresponding U.S. Appl. No. 15/971,194.

U.S. Non-Final Office Action dated Nov. 29, 2019 for corresponding U.S. Appl. No. 15/971,242.

Gao et al., 'A Statistical Method for Crack Detection from Vibrothermography Inspection Data',(2010) Statistics Preprints. Paper 68. http://lib.dr.iastate.edu/stat_las_preprints/68.

Li1 Ming; Holland1 Stephen D.; and Meeker1 William Q.1 "Statistical Methods for Automatic Crack Detection Based on Vibrothermography Sequence-of-Images Data" (2010). Statistics Preprints. 69.

Henneke et al. 'Detection of Damage in Composite Materials by Vibrothermography', ASTM special technical publication (696), American Society for Testing and Materials, 1979, pp. 83-95.

http://www.npl.co.uk/commercial-services/sector-case-studies/thermal-imaging-reveals-the-invisible; Apr. 17, 2012.

Tian et al., 'A Statistical Framework for Improved Automatic Flaw Detection in Nondestructive Evaluation Images', Technometrics, 59, 247-261. Feb. 1, 2017.

Emmanuel J. Cand'es1,2, Xiaodong Li2, Yi Ma3,4, and John Wright4, "Robust Principal Component Analysis", (1)Department of Statistics, Stanford University, Stanford, CA; (2)Department of Mathematics, Stanford University, Stanford, CA; (3, 4) Electrical and Computer Engineering, UIUC, Urbana, IL (4) Microsoft Research Asia, Beijing, China, Dec. 17, 2009.

Sebastien Parent; "From Human to Machine: How to Be Prepared for Integration of Automated Visual Inspection" Quality Magazine, https://www.qualitymag.com/articles/91976. Jul. 2, 2014.

(56) References Cited

OTHER PUBLICATIONS http://www.yxlon.com/products/x-ray-and-ct-inspection-systems/yxlon-mu56-tb, 2016.
U.S. Office action dated Jul. 23, 2018 issued in corresponding U.S. Appl. No. 15/971,254.
U.S. Non-Final Office Action dated Mar. 5, 2019 for corresponding U.S. Appl. No. 15/971,227.
U.S. Non-Final Office Action dated May 28, 2019 for corresponding U.S. Appl. No. 15/971,214.
U.S. Non-Final Office Action dated Apr. 16, 2019 for corresponding U.S. Appl. No. 15/970,985.
Blachnio et al, "Assessment of Technical Condition Demonstrated by Gas Turbine Blades by Processing of Images of Their Surfaces", Journal of KONBiN, 1(21), 2012, pp. 41-50.
Raskar et al., 'A Non-photorealistic Camera: Depth Edge Detection and Stylized Rendering using Multi-flash Imaging' ACM Transactions on Graphics, 2004 http://www.merl.com/publications/docs/TR2006-107.pdf.
Feris et al., 'Specular Reflection Reduction with Multi-Flash Imaging', 17th Brazilian Symposium on Computer Graphics and Image Processing, 2004. http://rogerioferis.com/publications/FerisSIB04.pdf.
Holland, "First Measurements from a New Broadband Vibrothermography Measurement System", AIP Conference Proceedings, 894 (2007), pp. 478-483. http://link.aip.org/link/doi/10.1063/1.2718010 \.
Gao et al., 'Detecting Cracks in Aircraft Engine Fan Blades Using Vibrothermography Nondestructive Evaluation', RESS Special Issue on Accelerated Testing, 2014, http://dx.doi.org/10.1016/j.ress.2014.05.009.
Gao et al., 'A Statistical Method for Crack Detection from Vibrothermography Inspection Data', Statistics Preprints. Paper 68. http://lib.dr.iastate.edu/stat_las_preprints/68.
Holland, 'Thermographic Signal Reconstruction for Vibrothermography', Infrared Physics & Technology 54 (2011) 503-511.
Li et al., 'Statistical Methods for Automatic Crack Detection Based on Vibrothermography Sequence-of-Images Data', Statistics Preprints. Paper 69. http://lib.dr.iastate.edu/stat_las_preprints/69.
Tian et al., 'A Statistical Framework for Improved Automatic Flaw Detection in Nondestructive Evaluation Images', Technometrics, 59, 247-261.
Henneke et al. 'Detection of Damage in Composite Materials by Vibrothermography', ASTM special technical publication (696), 1979, pp. 83-95.
http://www.npl.co.uk/commercial-services/sector-case-studies/thermal-imaging-reveals-the-invisible.
U.S. Non-Final Office Action dated Feb. 25, 2020 for corresponding U.S. Appl. No. 15/971,214.
U.S. Non-Final Office Action dated Apr. 30, 2020 issued for corresponding U.S. Appl. No. 15/970,944.
U.S. Final Office Action dated Jul. 28, 2020 issued for corresponding U.S. Appl. No. 15/971,214.
U.S. Non-Final Office Action dated May 21, 2020 issued for corresponding U.S. Appl. No. 15/971,236.
U.S. Non-Final Office Action dated Aug. 28, 2020 issued for corresponding U.S. Appl. No. 15/971,194.
U.S. Non-Final Office Action dated Jun. 23, 2020 issued for corresponding U.S. Appl. No. 15/971,205.
U.S. Notice of Allowance dated Oct. 19, 2020 issued for corresponding U.S. Appl. No. 15/971,270.
U.S. Final Office Action dated Jan. 3, 2019 for corresponding U.S. Appl. No. 15/971,254.

* cited by examiner

SYSTEM AND METHOD FOR ROBOTIC INSPECTION

BACKGROUND

The disclosure relates to robotic inspection of a part and, more particularly, to an automated system and method for inspecting mechanical components, especially turbine blades.

It is well known that mechanical components may incur imperfections during manufacturing and may suffer wear and damage during operation. These components, therefore, are episodically or periodically inspected for imperfections, damage, deformation, and wear. In particular, mechanical components such as turbine disks and airfoils have complex mechanical shapes that are difficult to manufacture and are operated under stresses that cause damage, e.g., leading edge erosion, hot corrosion (sulfidation), cracks, dents, nicks, gouges, etc. from foreign object damage. These turbine disks and airfoils are currently inspected manually by visual inspection or by non-destructive evaluation (NDE) techniques such as eddy current, ultrasound, or fluorescent penetrant inspection. These inspections are tedious, time consuming, imprecise, and error prone. Techniques to automate these types of inspection have been emerging, but the automated detection and operation can be improved.

Manual turbine blade damage detection is known in the prior art, e.g. using embedded vibroacoustic sensing and strain sensing. This prior art uses embedded or contacting sensors and is intended for wind turbines where the blades to not suffer the impact, erosional, or corrosion that gas turbine blades suffer. Also, blade damage detection for gas turbines is known, e.g. using eddy current sensors or by using mechanical touch probes, e.g., a coordinate measuring machine (CMM), but these require slow, laborious scanning of the blade surface.

It is known to process borescope video of blades in an engine to determine damage. This approach analyzes two dimensional (2D) images for differences between the current image and a model learned from other 2D images in a blade row. This is not suitable for determining damage in absolute units for components outside an engine. There is additional prior art for 2D (image-based) inspection systems wherein many steps are performed to determine the pose of an inspection device (a camera) with respect to the part and an a priori engineering model so that differences between the part and the model may be determined. This particular approach is unnecessarily inefficient and error prone. Some methods use X-rays, which requires special, shielded equipment.

SUMMARY

In accordance with the present disclosure, there is provided a method for robotic inspection of a part, which comprises the steps of: supporting the part with a robot mechanism; obtaining part-related sensor input with a sensor positioned to inspect the part supported by the robot mechanism; controlling movement of the robot mechanism relative to the sensor, wherein the controlling is done by a feedback control unit which receives the sensor input, and the feedback control unit is configured to control the robot mechanism based upon the sensor input.

In accordance with a further non-limiting embodiment, the method further comprises the steps of storing the part-related sensor input, or information derived therefrom, as past sensor input in a storage in communication with the feedback control unit and controlling movement of the robot mechanism based upon current sensor input and the past sensor input.

In a further non-limiting embodiment, the feedback control unit is further configured to plan a path of movement, relative to the sensor, of the part supported by the robot mechanism, wherein the path of movement is determined based upon the past sensor input.

In a further non-limiting embodiment, the sensor has a controllable lens and the feedback control unit is configured to control the lens based upon the part-related sensor input.

In a further non-limiting embodiment, the sensor further comprises a plurality of lenses and an automated lens changing system for positioning a lens of said plurality of lenses along a line of sight from the sensor to the part, and the method further comprises the step of changing the lens along the line of sight based upon the part-related sensor input.

In a further non-limiting embodiment, at least one filter is positioned along a line of sight from the sensor to the part, and the method further comprises the step of operating the filter based upon the part-related sensor input.

In a further non-limiting embodiment, the method further comprises illuminating the part with an illumination mechanism, and the feedback control unit is configured to control the illumination mechanism based on the part-related sensor input.

In a further non-limiting embodiment, at least one filter is positioned along a line of sight from the light mechanism to the part, and the method further comprises the step of operating the filter based upon the part-related sensor input.

In a further non-limiting embodiment, the illumination mechanism further comprises a controllable lens, and the feedback control unit is configured to control the lens based upon the part-related sensor input.

In a further non-limiting embodiment, the feedback control unit is configured to control the robot mechanism based upon the sensor input and manual input.

In a further non-limiting embodiment, the method further comprises the step of annotating the part based upon the part-related sensor input.

In a further non-limiting embodiment, an inspection system for robotic inspection of a part, comprises a robot mechanism configured to support the part, the robot mechanism being moveable to adjust position and pose of the part; a sensor positioned to obtain part-related sensor input of the part supported by the robot mechanism; and a feedback control unit in communication with the sensor to receive the part-related sensor input, the feedback control unit being configured to control movement of the robot mechanism based on the part-related sensor input.

In a further non-limiting embodiment, the system further comprises a storage in communication with at least one of the sensor and the feedback control unit, the storage being configured to receive and store the part-related sensor input or information derived therefrom.

In a further non-limiting embodiment, the feedback control unit is further configured to plan a path of movement, relative to the sensor, of the part supported by the robot mechanism, wherein the path of movement is determined based upon the past sensor input.

In a further non-limiting embodiment, the sensor has a controllable lens and the feedback control unit is configured to control the lens based upon the part-related sensor input.

In a further non-limiting embodiment, the sensor further comprises a plurality of lenses and an automated lens changing system for positioning a lens of said plurality of lenses along a line of sight from the sensor to the part, and the feedback control unit is configured to change the lens along the line of sight based upon the part-related sensor input.

In a further non-limiting embodiment, at least one filter is positioned along a line of sight from the sensor to the part, and the feedback control unit is configured to operate the filter based upon the part-related sensor input.

In a further non-limiting embodiment, an illumination mechanism is provided for illuminating the part, and the feedback control unit is configured to control the illumination mechanism based on the part-related sensor input.

In a further non-limiting embodiment, at least one filter is positioned along a line of sight from the illumination mechanism to the part, and the feedback control unit is configured to operate the filter based upon the part-related sensor input.

In a further non-limiting embodiment, the illumination mechanism further comprises a controllable lens, and the feedback control unit is configured to control the lens based upon the part-related sensor input.

In a further non-limiting embodiment, the feedback control unit is configured to control the robot mechanism based upon the sensor input and manual input.

Other details of the process are set forth in the following detailed description and the accompanying drawings wherein like reference numerals depict like elements.

DETAILED DESCRIPTION

The present disclosure relates to the automated inspection of a part such as a turbine blade or the like.

Various mechanical system components such as turbine blades, disks, and airfoils, require inspection for damage, defects, the need for repair and/or maintenance, and the like. One form of such inspection is automated inspection. During such inspection, the part is supported by a robot mechanism in a position relative to a sensor such that the position and pose of the part relative to the sensor can be adjusted primarily through movement of the robot mechanism. As disclosed herein, the position and pose of the part relative to the sensor are adjusted based upon part-related sensor input so that control of the position and pose of the part can be coupled to automated detection or inspection results. Thus, following this approach, an inspection can be conducted to focus more specifically on a location of a part which the current and/or past inspection has indicated a reason for further and/or more focused inspection to be conducted. Thus, according to the disclosure, robot motion is coupled to automated detection results. Another approach would be a "hybrid" approach, wherein the system is mostly automatic, but is configured to reach out to some other system or person for either confirmation, for example to help avoid re-certifying the inspection process, for annotation, and for guidance such as, for example, where to pay attention next, or for further analysis. For example, the system could reach out to a human on site or at a remote station, humans in the cloud or a more powerful image processing system in the cloud.

Figure 1:
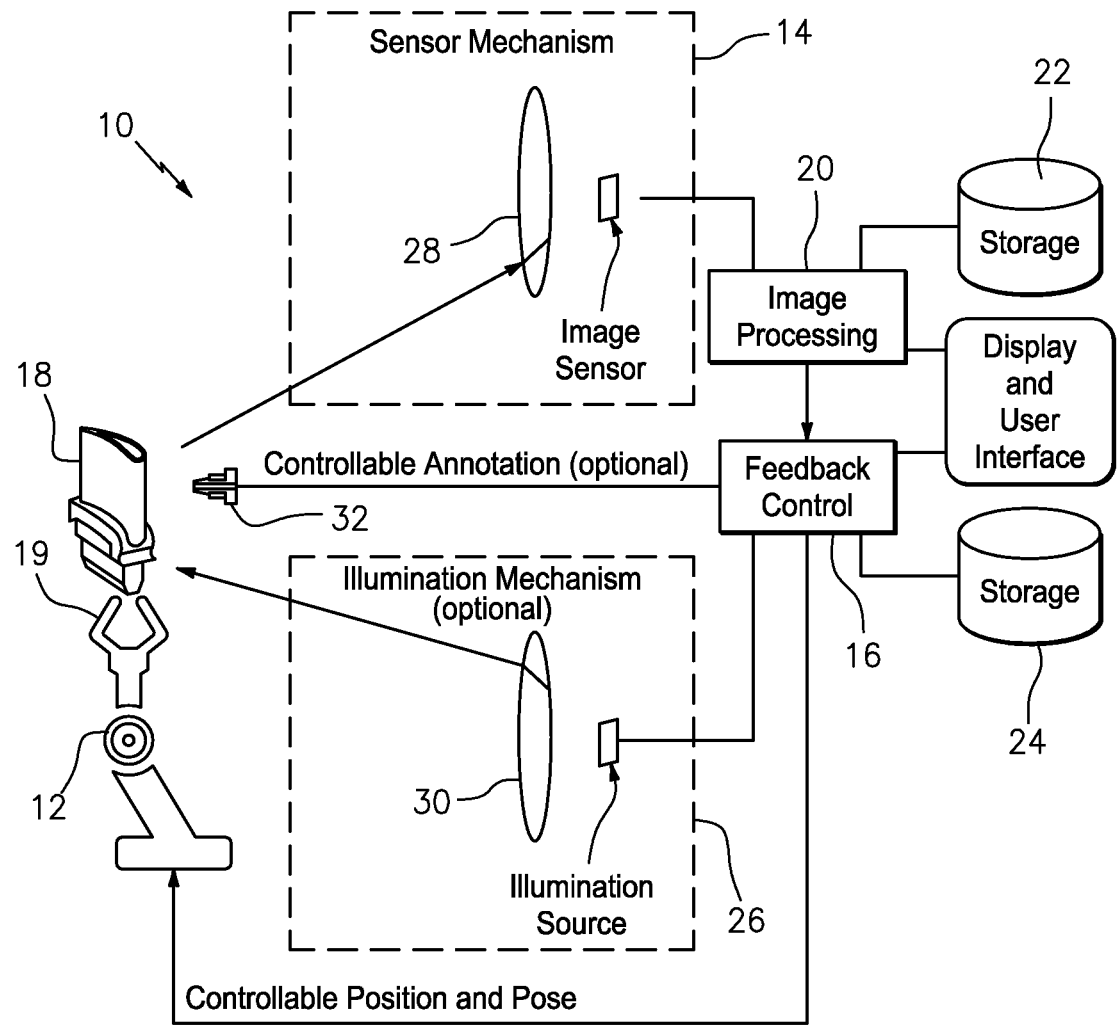
FIG. 1 illustrates a non-limiting embodiment of an automated system and process for automated component inspection.

FIG. 1 shows a system 10 including a robot mechanism 12, a sensor mechanism 14, and a feedback control unit 16.

As will be discussed further below, feedback control unit 16 controls operation of robot mechanism 12 to control the position and pose of a part 18 held by robot mechanism 12 relative to sensor mechanism 14.

Robot mechanism 12 can have various support mechanisms to hold part 18, such support mechanisms being schematically illustrated by graspers 19 in FIG. 1. Such support mechanisms can hold part 18 mechanically, or with suction or vacuum, or through any other manner suitable for firmly holding the part for inspection as desired.

Robot mechanism 12 is typically a fully articulated arm configured to allow multi direction adjustment of the position of a part, and particularly including rotation and orientation of the part at a particular location, which is referred to herein as the pose of the part. The position in which robot mechanism 12 holds part 18 is with respect to sensor mechanism 14, and the different positioning and pose allows for full inspection of the part.

Sensor mechanism 14 can be any of a wide variety of different sensors, such as image sensors, thermal sensors, or the like. Sensor mechanism 14 can, by way of further non-limiting example, comprise one or more two-dimensional (2D) cameras, three-dimensional (3D) depth sensors, and/or sonic sensor arrays, operating in any portion of the electromagnetic spectrum or acoustic spectrum (as relevant), to capture current information of a part under inspection. In the non-limiting embodiment of FIG. 1, sensor mechanism 14 is an image sensor or camera, which obtains as sensor input a sequence of images or video of a part supported in robot mechanism 12. This sensor input is referred to herein as part-related sensor input, and can be image data of the part, for example. The part-related sensor input can provide input to feedback control unit 16, for example through an image processing unit 20, and/or can be input to a storage unit 22. Components which pass data such as sensor input or control instructions are said herein to be communicated with each other, and/or in communication with each other. Thus, sensor mechanism 14 can be in communication with feedback control unit 16, optionally through image processing unit 20, and can also be in communication with storage unit 22.

The information or sensor input is processed and stored in a database, for example in storage unit 22, in such a way that relationships between the current inspection and previous inspections are established. The results of the current and previous inspections are provided to feedback control unit 16. One way to establish relationships is to add metadata about each inspection to the data stored in the database such as the individual part type, serial number, inspection date and time, inspection software version number, and the like.

Feedback control unit 16 can be any of a wide variety of processing units configured to execute and/or send various machine language commands including but not limited to commands which can be sent to robot mechanism 12 for controlling movement thereof. In addition, feedback control unit 16 can be configured to process sensor input from sensor mechanism 14 or receive processed sensor input from image processing unit 20. Feedback control unit 16 can also be in communication with storage unit 22 for accessing past part-related sensor input, for example. Feedback control unit 16 can also be in communication with a separate storage unit 24, which may contain various programming and machine executable instructions for controlling operation of the feedback control unit 16.

Of particular interest in the present disclosure, feedback control unit 16 is advantageously configured to control movement of the robot mechanism based on feedback from the sensor mechanism of a current inspection. Thus, if the part-related sensor input received in real time from the sensor mechanism indicates an area of a part needs to be inspected more closely or at a different pose, feedback control unit 16 is configured to send instructions to the robot mechanism to make such adjustments and enhance the inspection. In one non-limiting embodiment, feedback control 16 may implement a feedback control algorithm designed to reduce uncertainty or resolve a non-binary probability in damage detection of part 18. That is, image processing unit 20 may use a statistical damage detection algorithm that provides a probability of detection. If in any instance this probability is not zero or one, feedback control unit 16 may iteratively change the pose, illumination, and/or sensing of part 18 to drive the probability or detection to either zero or one. The feedback control may be considered or implemented as an optimization process with uncertainty as its objective function. In one case, the optimization may comprise a complete exploration of the parameter space.

Also of interest, since feedback control unit 16 has access to past part-related sensor input, which for example may be stored in storage unit 22, the initial movement path of robot mechanism 12 can be set or adjusted to focus specifically on areas of already identified interest, such as defects already detected in a disk, blade row, or the like. Thus, feedback control unit 16 provides path planning based on prior information such as past part-related sensor input.

A further aspect of interest with respect to interaction of feedback control unit 16 in system 10, related to the path planning mentioned above, is to design the initial movement path of robot mechanism based on past part-related sensor input such that a maximum amount of information is gained by the inspection. In other words, the position and pose of the part can be selected by feedback control unit 16 such that knowledge of a particular part being inspected is maximized per each movement path of robot mechanism 12 and part 18 supported thereby relative to sensor mechanism 14.

In a further non-limiting aspect of the present disclosure, an illumination mechanism 26 can be provided for illuminating part 18 supported by robot mechanism 12 such that sensor mechanism 14 can obtain more clear and well illuminated part-related sensor input. Illumination mechanism 26 can be any suitable source of light which is suitable for enhancing inspection of a part. Such light can be in the visible spectrum, or in other spectra suitable to various types of inspection which may be desired. Further, illumination mechanism 26 can be controlled by feedback control unit 16 in a basic sense to power on or off, and also to increase or decrease intensity and/or type of illumination, such as wavelength, band of wavelengths, polarization, spatial structure, and the like. Controllable filters can be included in both the illumination mechanism 26 and sensor mechanism 14 to allow automated selection of wavelength and polarization.

All such control can be based upon current or past part-related sensor input. For example, if past part-related sensor input indicated a portion of a complex structure was not properly illuminated during inspection, position and pose of the part can be adjusted, as can intensity of light from illumination mechanism 26, to obtain better part-related sensor input in the next inspection and/or for the remainder of the current inspection.

Figure 2:
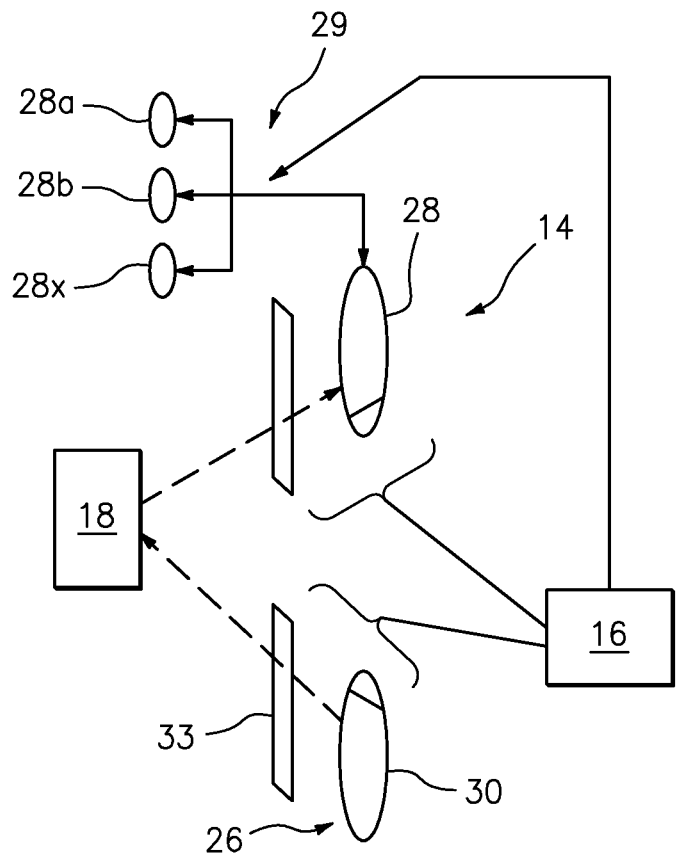
FIG. 2 illustrates a further non-limiting embodiment.

Returning to sensor mechanism 14, a further non-limiting embodiment includes sensor mechanism 14 having a controllable lens schematically illustrated at 28. Controllable lens 28 can allow for enhanced specific inspection of a particular area of a part, thus enhancing proper positioning and pose of the part relative to the sensor by allowing focus from the sensor side as well. Lens 28 can be controlled by feedback control unit 16 as with other components of system 10, again so that results of current and past part inspection can be used to enhance movement of robot mechanism 12 and focus of sensor mechanism 14 to produce more accurate and effective inspection. It should also be appreciated that within the scope of a controllable lens 28 is a lens system with physical lens changes, for example where the desired or intended change (e.g. magnification) is more than can be accomplished with a single adjustable lens. In this configuration, the system can be configured to operate an automated lens changing system. FIG. 2 further illustrates certain aspects of system 10, including sensor mechanism 14 having an interchangeable lens system schematically illustrated at 29 and being configured to switch out lens 28 with one or more different lenses 28a, 28b . . . 28x. Interchangeable lens system could be controlled by feedback control unit 16, again as schematically illustrated, and could utilize conveyors, robots, or any other mechanism suitable for removing and replacing lens 28.

As set forth above, one or more filters can also be incorporated into system 10 to modify operation of either sensor mechanism 14 and lens 28, or illumination mechanism 26 and/or lens 30. FIG. 2 shows filters 31, 33 positioned for this purpose, in this case along a line of sight from either lens 28 or lens 30, or both, to part 18. As with lens 28, 30, filters 31, 33 can be controllable and/or interchangeable to adapt the system to produce useful imaging and analysis. FIG. 2 also shows schematic control connections, or communications, between feedback control unit 16 and components of sensor mechanism 14, illumination mechanism 26 and interchangeable lens system 29.

Similarly, illumination mechanism 26 can have a controllable lens 30 which can be used to focus, diffuse, or otherwise adjust light being directed to part 18 during inspection. Feedback control unit 16 is configured and in communication with illumination mechanism 26 to control lens 30 to focus light from illumination mechanism 26 in a way which is directed by results of current or past inspection and part-related sensor input. Again, by way of non-limiting example, if a portion of a part is not clearly seen in images obtained during either a prior or current inspection, this will be identified by feedback control unit 16 and instructions sent to robot mechanism 12 to change position or pose of the part relative to sensor mechanism 14, and also in this case to adjust focus of light emitted by illumination mechanism 26 to more fully illuminate a formerly obscured or not clearly inspected area of the part. Lens 28 and/or filters 31, 33 could also be adjusted.

Figure 3:
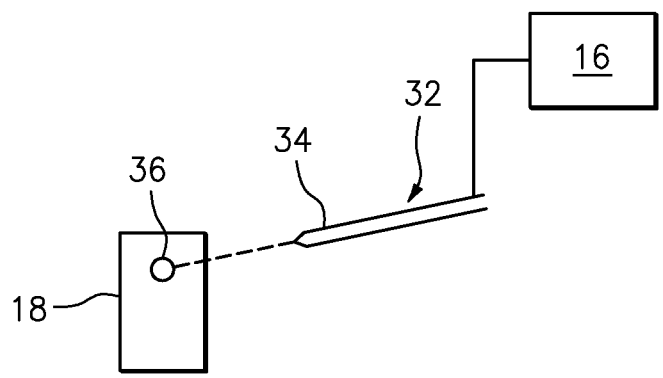
FIG. 3 illustrates a further non-limiting embodiment.

Still referring to FIG. 1, feedback control unit 16 can also be configured to produce controllable annotation 32. Annotation 32 may be accomplished by any device capable of depositing ink or other indicia onto part 18. For example, a deposition device may comprise a controllable inkjet print head schematically illustrated at 34 (FIG. 3). A fiducial mark 36 denoting a detected damage location may be deposited onto part 18 by the deposition device. The fiducial mark may comprise any unique and/or distinguishable mark capable of being detected by image processing unit 20 via sensor mechanism 14. For example, a fiducial mark may comprise a dot, line, circle, square, polygon, numerical values, Roman numerals, alphabetical characters, or any other distinguishable marks. The ink may comprise a high temperature resistant marking agent. In general, the ink may comprise any subsequently detectable material, e.g., the ink may be visibly detectable as described, may contain infrared fluorescent constituents, radioactive tracers, and the like. Similarly, sensor mechanism 14 may be additionally sensitive to non-human-visible portions of the electromagnetic spectrum, radiation, and the like. In one non-limiting embodiment, the ink could be a high-temperature, non-reactive blue ink such as DYKEM® High Temp 44 Medium Blue (Item #44094 from American Marking, Inc.), or the ink described in US Application No. 2003/0101899 to Hartanto. The deposition device may be spatially controllable to move relative to part 18, may be spatially stationary while robot mechanism 12 moves part 18, or a combination of the above.

The method of operation of system 10 can be further discussed and understood through consideration of FIG. 1 as a process scheme. System 10 begins operation with a part 18 supported by robot mechanism 12. Initial inspection may already be programmed and stored in either storage unit 22 or 24 for conducting an initial inspection of the part. Such initial inspection data may be the result of an earlier inspection using system 10, could be generated based on expected part-related data, could be based on mimicking a one-time human inspection, and the like. Once inspection starts, part-related sensor input is obtained with sensor mechanism 14 and communicated to image processing unit 20. Sensor input is processed and the processed input is sent to and stored in storage unit 22. In addition, processed sensor input is received by feedback control unit 16. Feedback control unit 16 analyzes such input and generates control instructions which are sent to robot mechanism 12, and also to sensor mechanism and/or illumination mechanism 26 as desired. These control instructions adjust the positon and pose, as well as sensor and/or light focus, to obtain additional sensor input related to part 18, which is obtained and fed to image processing unit 20 and feedback control unit 16 for further analysis and issuance of control commands by feedback control unit 16. This can continue until inspection is considered complete, either through substantive passing of inspection, or obtaining a predetermined amount of additional part-related sensor data, or the like.

As disclosed herein, feedback control unit 16 operates to provide one or more of the following:

Repositioning based on the current inspection, e.g., to re-inspect from a different relative location or pose and combine the new inspection results with the previous results using, for instance, a Bayesian damage estimator, to produce a first fused inspection result. The re-inspection process may now continue with the first fused inspection result used as the previous inspection result. This iterative process can terminate when the fused result is the same as the previous result or when a predetermined number of iterations is reached, for example.

Inspection path planning can be based on prior information such as already detected defects in a disk, blade row, and the like. That is, a default sequence of location and pose robot controls may be modified based on the spatial probability of damage and the probability that the current part is related to previous parts. This path planning may exploit UAV probabilistic search path planning as modified for part similarity.

Inspection path planning can also be based on expected information gain. The expected information gain is the change in information from a prior state, or previous inspection, to a state that takes some information as known (current inspection). That is, a default sequence of location and pose robot controls may be modified to make a next inspection where the expected information gain is maximized. The information gain may be learned from previous inspections, which can serve as training examples, and may be fixed after training, or may be adapted continuously during inspection.

There has been provided a system and method for automated inspection of a part which provides for a coupling of robot motion with current and/or past inspection results, thereby reducing uncertainty in detection and producing a more fully automated and reliable part inspection. While the system and method have been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A method for robotic inspection of a part, comprising the steps of:

supporting the part with a robot mechanism;

obtaining part-related sensor input with a sensor positioned to inspect the part supported by the robot mechanism;

controlling movement of the robot mechanism relative to the sensor, wherein the controlling is done by a feedback control unit which receives the sensor input, and the feedback control unit is configured to control the robot mechanism based upon the sensor input, wherein the part is a turbine blade, disk or airfoil of a gas turbine engine, further comprising illuminating the part with an illumination mechanism, and wherein the feedback control unit is configured to control the illumination mechanism based on the part-related sensor input, and further comprising at least one filter positioned along a line of sight from the illumination mechanism to the part, and further comprising the step of operating the filter based upon the part-related sensor input.

2. The method of claim 1, further comprising the steps of storing the part-related sensor input, or information derived therefrom, as past sensor input in a storage in communication with the feedback control unit and controlling movement of the robot mechanism based upon current sensor input and the past sensor input.

3. The method of claim 2, wherein the feedback control unit is further configured to plan a path of movement, relative to the sensor, of the part supported by the robot mechanism, wherein the path of movement is determined based upon the past sensor input.

4. The method of claim 1, wherein the sensor has a controllable lens and wherein the feedback control unit is configured to control the lens based upon the part-related sensor input.

5. The method of claim 1, wherein the illumination mechanism further comprises a controllable lens, and wherein the feedback control unit is configured to control the lens based upon the part-related sensor input.

6. The method of claim 1, wherein the feedback control unit is configured to control the robot mechanism based upon the sensor input and manual input.

7. The method of claim 1, further comprising the step of annotating the part based upon the part-related sensor input.

8. The method of claim 1, wherein the controlling step moves the part to an adjusted position of the part relative to the sensor, and further comprising obtaining additional sensor input at the adjusted position.

9. A method for robotic inspection of a part, comprising the steps of:
supporting the part with a robot mechanism;
obtaining part-related sensor input with a sensor positioned to inspect the part supported by the robot mechanism;
controlling movement of the robot mechanism relative to the sensor, wherein the controlling is done by a feedback control unit which receives the sensor input, and the feedback control unit is configured to control the robot mechanism based upon the sensor input, wherein the sensor further comprises a plurality of lenses and an automated lens changing system for positioning a lens of said plurality of lenses along a line of sight from the sensor to the part, and further comprising the step of changing the lens along the line of sight based upon the part-related sensor input.

10. A method for robotic inspection of a part, comprising the steps of:
supporting the part with a robot mechanism;
obtaining part-related sensor input with a sensor positioned to inspect the part supported by the robot mechanism;
controlling movement of the robot mechanism relative to the sensor, wherein the controlling is done by a feedback control unit which receives the sensor input, and the feedback control unit is configured to control the robot mechanism based upon the sensor input, further comprising at least one filter positioned along a line of sight from the sensor to the part, and further comprising the step of operating the filter based upon the part-related sensor input.

11. An inspection system for robotic inspection of a part, comprising:
a robot mechanism configured to support the part, the robot mechanism being moveable to adjust position and pose of the part;
a sensor positioned to obtain part-related sensor input of the part supported by the robot mechanism; and
a feedback control unit in communication with the sensor to receive the part-related sensor input, the feedback control unit being configured to control movement of the robot mechanism based on the part-related sensor input, wherein the sensor further comprises a plurality of lenses and an automated lens changing system for positioning a lens of said plurality of lenses along a line of sight from the sensor to the part, and wherein the feedback control unit is configured to change the lens along the line of sight based upon the part-related sensor input.

12. The system of claim 11, further comprising a storage in communication with at least one of the sensor and the feedback control unit, the storage being configured to receive and store the part-related sensor input or information derived therefrom.

13. The system of claim 12, wherein the feedback control unit is further configured to plan a path of movement, relative to the sensor, of the part supported by the robot mechanism, wherein the path of movement is determined based upon past sensor input.

14. The system of claim 11, wherein the sensor has a controllable lens and wherein the feedback control unit is configured to control the lens based upon the part-related sensor input.

15. The system of claim 11, further comprising an illumination mechanism for illuminating the part, and wherein the feedback control unit is configured to control the illumination mechanism based on the part-related sensor input.

16. The system of claim 15, further comprising at least one filter positioned along a line of sight from the illumination mechanism to the part, and wherein the feedback control unit is configured to operate the filter based upon the part-related sensor input.

17. The system of claim 16, wherein the illumination mechanism further comprises a controllable lens, and wherein the feedback control unit is configured to control the lens based upon the part-related sensor input.

18. The system of claim 11, wherein the feedback control unit is configured to control the robot mechanism based upon the sensor input and manual input.

19. An inspection system for robotic inspection of a part, comprising:
a robot mechanism configured to support the part, the robot mechanism being moveable to adjust position and pose of the part;
a sensor positioned to obtain part-related sensor input of the part supported by the robot mechanism; and
a feedback control unit in communication with the sensor to receive the part-related sensor input, the feedback control unit being configured to control movement of the robot mechanism based on the part-related sensor input, further comprising at least one filter positioned along a line of sight from the sensor to the part, and wherein the feedback control unit is configured to operate the filter based upon the part-related sensor input.

* * * * *